April 13, 1943.  E. C. VOLLMER ET AL  2,316,200

BLADE SPACER

Filed March 6, 1939  3 Sheets-Sheet 1

INVENTORS
EARL C. VOLLMER
FREDERICK A. HERWEHE
BY
ATTORNEYS

April 13, 1943.  E. C. VOLLMER ET AL  2,316,200
BLADE SPACER
Filed March 6, 1939  3 Sheets-Sheet 2

INVENTORS
EARL C. VOLLMER
BY FREDERICK A. HERWEHE
ATTORNEYS

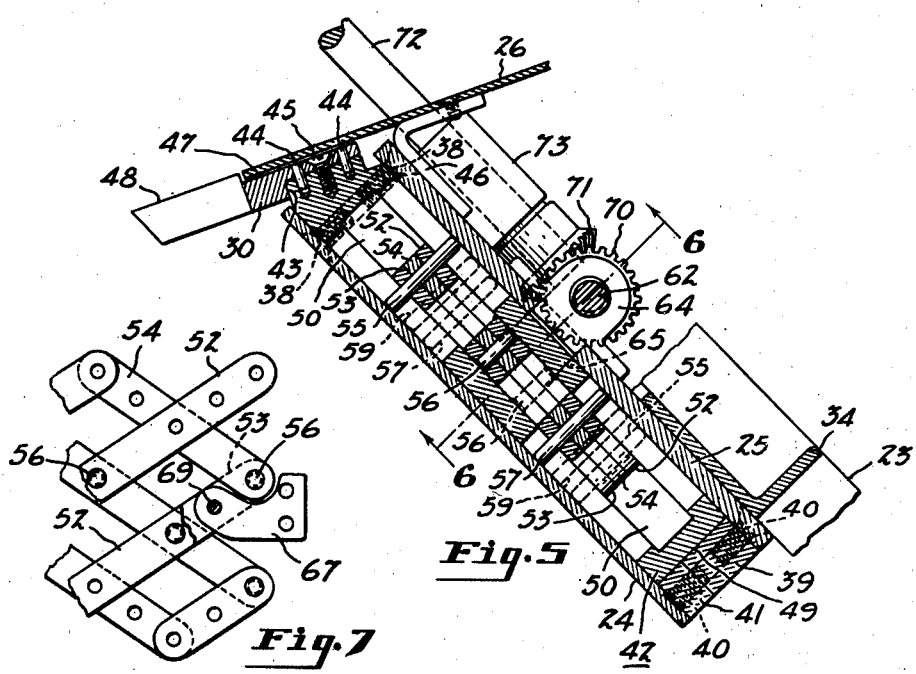
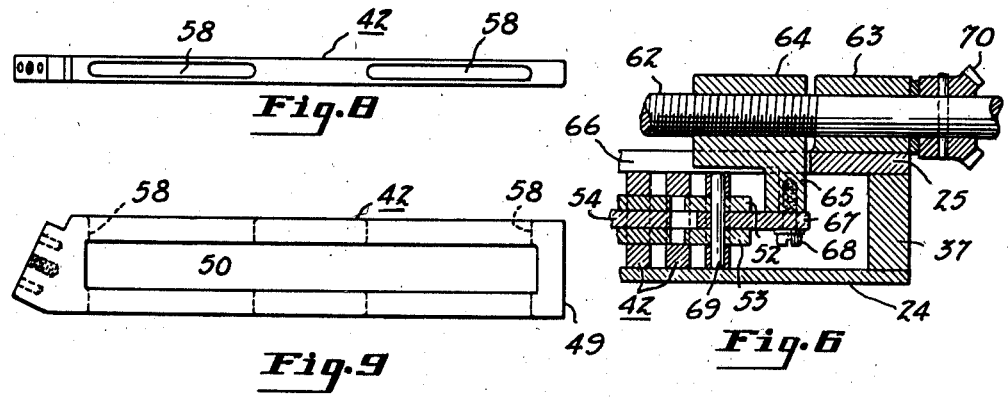

Patented Apr. 13, 1943

2,316,200

UNITED STATES PATENT OFFICE 2,316,200

BLADE SPACER

Earl C. Vollmer and Frederick A. Herwehe, Rock Island, Ill., assignors, by mesne assignments, to The Bettendorf Company, a corporation of Maryland Application March 6, 1939, Serial No. 260,044

17 Claims. (Cl. 146—88)

This invention relates to improvements in blade spacers, and more particularly to blade spacers for adjusting the distance between the multiple slicing knives or cutters of slicing machines, so as to vary the thickness of the slices produced thereby.

In slicing machines employing a plurality of endless cutter bands it is desirable to have adjustable means for guiding and positioning the runs of the bands, so as to provide a multiplicity of evenly spaced cutters through which an article, such as a loaf of bread, may be passed for the purpose of cutting the same into slices. In certain machines of this character it is necessary to twist as well as guide the bands, so that the guiding mechanism must be relatively strong and rigid and free from lateral play or deflection to resist the twisting of the blades and to restrain the blades against weaving and other objectionable deflection. It is, therefore, an object of the invention to provide in a machine of this character an adjustable blade guiding and spacing mechanism having individual elements or fingers for separately engaging the cutters, which is of increased rigidity and strength, to firmly position and support the cutters, and is capable of maintaining uniform and even spacing between the cutters so that the slices produced thereby are of uniform thickness and free from objectionable irregularities or waves.

Another object is to provide a blade spacer having guide elements or fingers and manually operable mechanism for drawing the guides together to decrease the spacing between the blades guided thereby and manually operable mechanism for separating the guides to increase the spacing between the blades.

Another object is to provide in a machine employing a multiplicity of flexible blades, adjustable guides to be disposed on opposite sides of the path of articles moving to the cutter blades and improved means for simultaneously adjusting both sets of guides to vary the spacing between the blades while the slicing mechanism is in continuous operation.

A more specific object is to provide, in a slicing machine of the character having a plurality of resilient endless cutter bands carried under tension on spaced drums, an adjustable mechanism for spacing and guiding the individual laps of the cutter bands on both sides of the path of articles through the cutters in which mechanism guide elements for spacing the bands are slidably carried by a supporting member and the means for effecting the adjustment of the guide elements is supported by the guide elements.

Another object is to provide an improved spacing and guiding mechanism of adjustable character for bread slicing machines and the like which is relatively simple in design and construction and inexpensive to manufacture. Other objects and advantages will become apparent from the following detailed description of a suitable embodiment of the invention, which is made with reference to the accompanying drawings, in which:

Fig. 5 is a sectional detail taken substantially on the line 5—5 of Fig. 3;

Fig. 6 is a sectional detail, with parts removed, showing the actuating mechanism for adjusting the position of the guide elements or spacers, taken substantially on the line 6—6 of Fig. 5;

Fig. 7 is a fragmentary detail showing the connection for attaching the actuating mechanism to one end of the lazy tongs;

Fig. 8 is a detail view showing one of the guide elements; and

Fig. 9 is an elevational view of the guide element shown in Fig 8.

Figure 1:
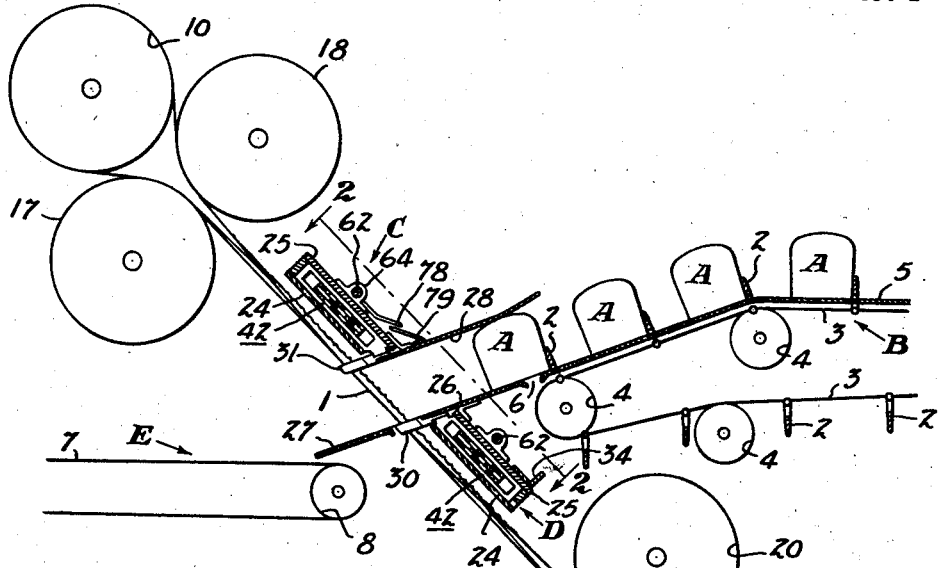
Figure 1 is a diagrammatic illustration, with parts removed, showing the manner in which the blade guiding and spacing mechanism is used in connection with a slicing machine employing a multiplicity of endless cutter bands.

The adjustable blade guiding and spacing device of the present invention is applicable to advantage in numerous machines. In the present instance it is shown as applied to a bread slicing machine of the type having a plurality of endless cutter bands, such, for example, as that disclosed in the application of A. A. Kottmann and Earl C. Vollmer, Serial No. 260,046, filed March 6, 1939.

Referring to the drawings by letters and numerals of reference, which indicate like parts throughout the several views, the slicing machine comprises an infeed conveyor B, which receives articles A and advances the same between upper and lower spacing devices C and D, which guide the runs or laps of flexible cutters 1. The sliced articles are received and carried away by an outfeed or discharge conveyor E.

The infeed conveyor B may be of conventional construction, such, for example, as the type having a number of evenly spaced flights 2, which are carried between spaced, parallel, endless belts or chains 3, running over rotatable sprockets or pulleys 4. The flights 2, as they move toward the slicing mechanism, or cutters 1, pass over an apron or table 5 which supports the articles A. At the end of their article advancing movement the flights drop through a slot 6 at the end of the table 5 and return to the receiving end of the table. In this manner the articles are positively advanced to and through the cutting mechanism, it being understood that a plurality of loaves may be disposed between the slot 6 and the cutters 1. Such loaves are advanced through the cutters one at a time as the flights successively bring up additional loaves.

The discharge conveyor E may be of any suitable type, such, for example, as an endless belt 7, one end of which is carried adjacent the slicing mechanism by a rotatable member 8, and the other end of which is carried by a similar rotatable element (not shown).

The cutters 1 comprise a multiplicity of relatively thin, flat, endless steel bands of substantially equal length, which are mounted on spaced parallel top and bottom drums 10 and 11, respectively. Between the two drums each band blade is given a half twist, so that it takes substantially a figure 8 form and the runs or laps thereof cross one another midway between the drums to present the cutting edges of the runs toward the oncoming articles or loaves A. In this manner both runs or laps of each cutter band are effective to slice the articles and the runs move in opposite directions so that alternate cutters across the entire width of the slicing mechanism move continuously in opposite directions and are guided by the upper and lower spacers C and D, respectively, to be later described. The drive for the cutters is by means of an electric motor 12, having a pulley 14 which actuates a belt 15, trained over a pulley 16, connected to the bottom drum 11.

Preferably, a pair of upper guide drums 17 and 18 are disposed in parallel relation to one another and adjacent and parallel to the upper drum 10 to displace the two runs or laps of the cutter bands 1 toward each other. Similarly, bottom guide drums 19 and 20, are disposed parallel to one another and adjacent and parallel to the bottom drum 11, to likewise displace the cutters. Thus the cutters are displaced into approximately a common plane throughout a major part of their length between the end drums.

It is to be understood that shafts for supporting the blade drums and the conveyors are provided and may be journaled in suitable side frames (fragments of which are indicated at 22 and 23, Fig. 2), so that the mechanism is in the form of a unitary structure.

Each of the blade spacing and guiding devices C and D comprises support members 24 and 25, which are disposed in spaced, parallel relation with respect to one another to provide a housing or chamber for the guiding and spacing mechanism. The support members are located transversely across the slicing machine between the side frames 22 and 23, and adjacent the cutters 1, being substantially parallel to the common plane of the latter. Secured to the support member 25 of the bottom spacer D is an apron 26, which extends toward the table 5 of the infeed conveyor and has an edge at one side of the flight slot 6. Preferably, the apron 26 is disposed in the same plane, or substantially so, as the discharge end of the conveyor table 5, so that articles move readily from the end of the conveyor table onto the apron 26. On the opposite side of the cutters 1 from the apron 26, and in line therewith, is a discharge apron 27, which supports sliced articles as they move from the cutters to the belt 7 of the discharge conveyor E.

An article holddown member 28 is secured to the support member 25 of the upper spacing device C and extends over the apron 26 and table 5 of the infeed conveyor, so as to engage the tops of articles moving toward the slicing mechanism to confine the articles against lateral and other displacement during the slicing operation.

Guide fingers 30 of bottom spacer D are disposed along the upper edge thereof, while guide fingers 31 of the upper spacer C are disposed along the bottom edge of the latter. These guide fingers 30 and 31 are made of a suitable wear-resisting material, such, for example, as stainless tool steel, and are provided with elongated slots 32 (Figs. 3 and 4) which receive individual runs of the cutters 1.

Figure 2:
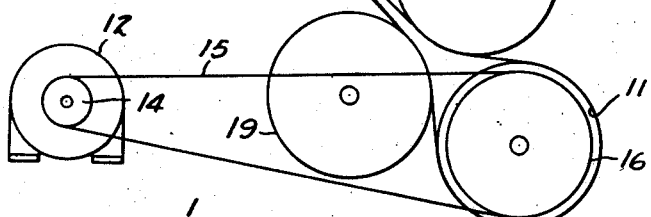
Fig. 2 is a fragmentary detail, with parts removed, taken substantially on the line 2—2 of Fig. 1, and enlarged with respect thereto.
Figure 2:
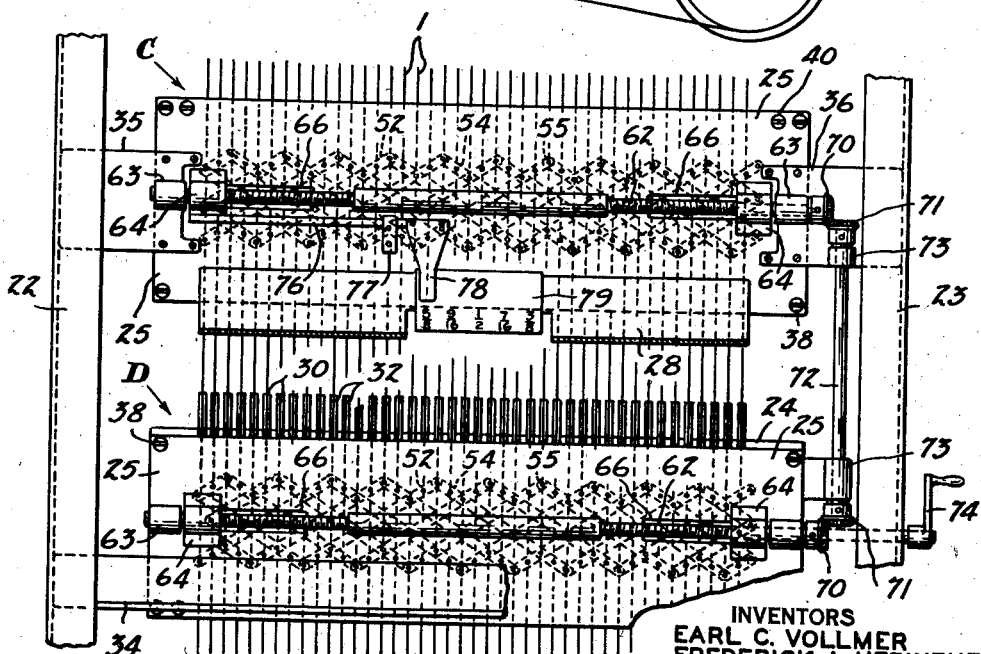

The lower blade spacer D is mounted on cross member 34, to which is attached the supporting member 25. As shown in Fig. 2, the cross member 34 has its ends secured to the frame members 22 and 23 in any suitable manner, such, for example, as by welding. The upper blade spacer C is carried by brackets 35 and 36, secured to the frame members 22 and 23, and to which is attached the support member 25.

The description of the construction of the guiding and spacing devices is made in connection with the bottom spacer D. However, the essentials of the upper spacer C are counter parts of the elements of the spacer D and the description of one is applicable to the construction of the other.

End members 37 are disposed between the ends of the support members 24 and 25 of both upper and lower blade spacers C and D to separate the support members and maintain them in fixed relation with respect to one another. Bolts 38 extend through the support members and end members 37 to secure the parts together.

Between the rear edges of the support members 24 and 25 is disposed a side member 39, secured in place by bolts 40. This side member has portions removed adjacent the support member 24 which serve as outlets 41 for crumbs and other debris that may collect in the housing or chamber of the spacing device.

A multiplicity of guide elements 42 are disposed in parallel side by side relation between the support members 24 and 25 and have sliding engagement therewith. These guide elements are thin and elongated, preferably having a length several times their width and a width several times their thickness. It will be apparent that the thickness of the elements must be no greater than the narrowest spacing to which the cutters 1 are to be adjusted by the device.

One end of each of the guide elements 42 extends through an open or front end of the chamber or housing between the support members 24 and 25, and has secured thereon one of the guide fingers 30 or 31, as the case may be. Preferably, the fingers 30 have cutaway portions which fit over the ends of the members 42, thus providing shoulders 43 which abut against end edges of the guide elements. Pins 44 extending into the fingers and guide elements resist lateral movement of the fingers with respect to the guide elements, and the fingers are held in place by screws 45, threaded into the ends of the guide elements. One end of the article supporting apron 26, which is secured to the support member 25 by one or more brackets 46, extends over the ends of the guide elements 42 so as to retain the latter within the housing chamber between the support members 24 and 25. Preferably, the surfaces of the fingers 30 which underlie the end of the apron 26 are recessed or cutaway, as indicated at 47, so that the surface of the apron 26 and the article supporting surfaces 48 of the fingers 30 are disposed in substantially a common plane.

Ends 49 of the guide elements 42, which are opposite the finger-holding ends thereof, seat against the side member 39, thus preventing endwise movement of the guide elements and retaining all the fingers 30 substantially in alinement with one another.

Each of the guide elements 42 has formed therethrough an aperture 50, which is alined with the corresponding apertures in the other guide elements of the spacing device. Through the alined apertures 50 extends a multiple lazy tongs, which includes three groups of substantially identical elongated elements arranged in superposed relation with respect to one another, the elements of each group being disposed in substantially a common plane. One group comprises the elements 52, which are in parallel relation with respect to one another. Another group comprises the elements 53, which are in underlying relation with respect to the elements 52, and likewise parallel to one another. The third group comprises the elements 54 which are disposed between the groups 52 and 53. The elements 54 are parallel to one another and arranged in diagonal relation with respect to the elements 52 and 53 of the other groups.

At the points where the lazy tong elements cross one another they are provided with alined apertures which receive pins to serve as pivots. The number of pivots for each element of the lazy tongs is subject to variation depending on the length thereof. In the embodiment illustrated, six pivots are shown for each element, although a lesser number such as four might be used. The apertures at the ends of the lazy tong elements receive pins 55, while the apertures at the central part of the lazy tongs receive pins 56. The end pins 55 and intermediate pins 57 (the latter being disposed between the pins 55 and 56) are of sufficient length to project beyond the sides of the lazy tong elements 52 and 53, and their ends substantially abut against the inside surface of the support members 24 and 25 to be guided by the latter. The pins 55 along one edge of the lazy tongs are each aligned with one of the pins 57 on the opposite side of the lazy tongs.

The projecting ends of the pins 55 and 57 thus aligned across the width of the tongs are received in elongated slots or channels 58 formed through the guide elements 42. Between the pins 55 and 57 the lazy tong elements are apertured to receive auxiliary pins 59, which are similar to the pins 55 and 57, and are of sufficient length to project beyond the sides of the lazy tong elements and have their ends guided by the support members 24 and 25. The projecting ends of the pins 59 are received in the slots or channels 58 of the guide elements which are disposed between the guide elements received on the pins 55 and 57. Movement of the lazy tongs to expand or contract the same effects a parallel movement of the guide elements 42 through the engagement of the latter by the pins 55, 57 and 59. It is to be noted that the distances between the adjacent pivot pins 55, 56, and 57 are substantially equal for all the lazy tong elements so that a characteristic parallel motion is imparted to all the elements when the lazy tongs are expanded or contracted. Preferably, spacing washers 60 are provided for the pins 59 which are received in apertures in the lazy tong elements 54. The central pins 56 are shorter than the pins at the ends of the lazy tong elements and are secured in place in any suitable manner, such, for example, as by peening over the ends thereof substantially flush with the sides of the lazy tong elements. These central pins serve to hold the lazy tong elements together during assembly of the spacing devices.

Each of the guide elements 42 is held in position by a multiplicity of lazy tong elements, so as to effect a more rigid construction and prevent wobbling in the joints, regardless of the position to which the blade spacing fingers are adjusted. For example, by reference to Fig. 3, which shows the blade spacing elements in expanded position, it may be observed that the guide element 42a is held in position by pivot or positioning pins 55a and 57a. The pin 55a is held or located by lazy tong element 54a and the lazy tong elements 52a and 53a, the latter not appearing since it underlies the element 52a. The pivot pin 57a is positioned by lazy tong element 54b and lazy tong elements 52b and 53b, the latter not appearing since it underlies the element 52b. Thus, six lazy tong elements are effective to retain the guide element 42a in adjusted position to prevent lateral play and misadjustment, and each of the lazy tong elements is pivotally connected to six of the other lazy tong elements disposed in diagonal relation with respect thereto. While it has been found preferable to thus attach each element to six of the other elements, it has been found satisfactory if it be attached to a lesser number, such, for example, as four. It is to be understood, however, that although the spacing device illustrated includes three groups of lazy tong elements, satisfactory results are obtainable by the use of a lesser number, as two groups. For example, the elements 52 or the elements 53 could be omitted and in such case, there would be four lazy tong elements for retaining each of the guide elements 42. By the use of three or more groups of lazy tong elements, in the manner set forth above, the pins for locating or positioning the guide elements have less tendency to wobble in the holes of the lazy tong elements, thus providing a more rigid structure. Thus the present invention minimizes lateral play and deflection in the spacer.

A mechanism for expanding and contracting the lazy tongs is provided, which comprises a rotatable shaft 62 disposed lengthwise of the support member 25 in parallel relation to the direction of movement of the lazy tongs in expanding and contracting. The ends of the shaft 62 are carried by journals 63, secured to the support member 25.

Oppositely threaded ends of the shafts 62 threadedly receive blocks 64, which have sliding engagement with the support members 25 and are guided thereby. Depending portions 65 of the blocks 64 extend through elongated slots 66 in the support member 25 and into the chamber of the spacing device. Curved members 67, secured by screws 68 to the portions 65 of the blocks 64, are received between the endmost of the lazy tong elements 52 and 53 (which may be shorter than the others) and are pivotally connected thereto by pins 69, received in alined apertures in the end lazy tong elements 52 and 53 and the member 67.

Figure 3:
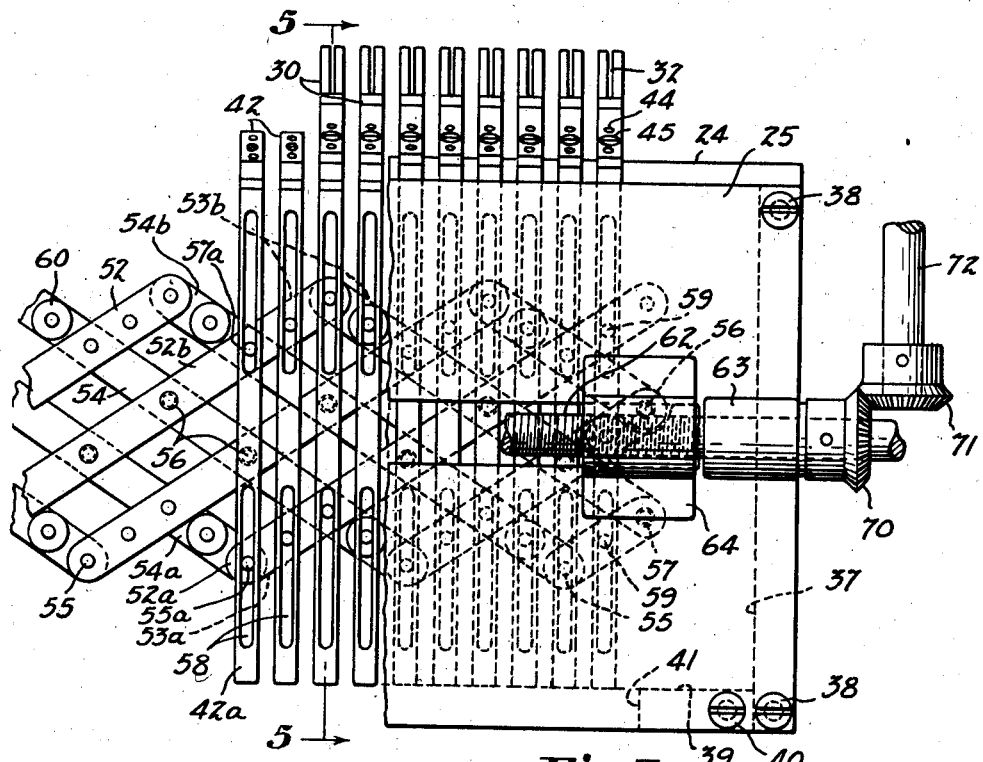
Fig. 3 is a fragmentary detail showing one of the blade guiding and spacing devices in the form of a multiple lazy tongs with the individual elements thereof in expanded position to provide for a relatively wide spacing of the cutters to be guided thereby.
Figure 4:
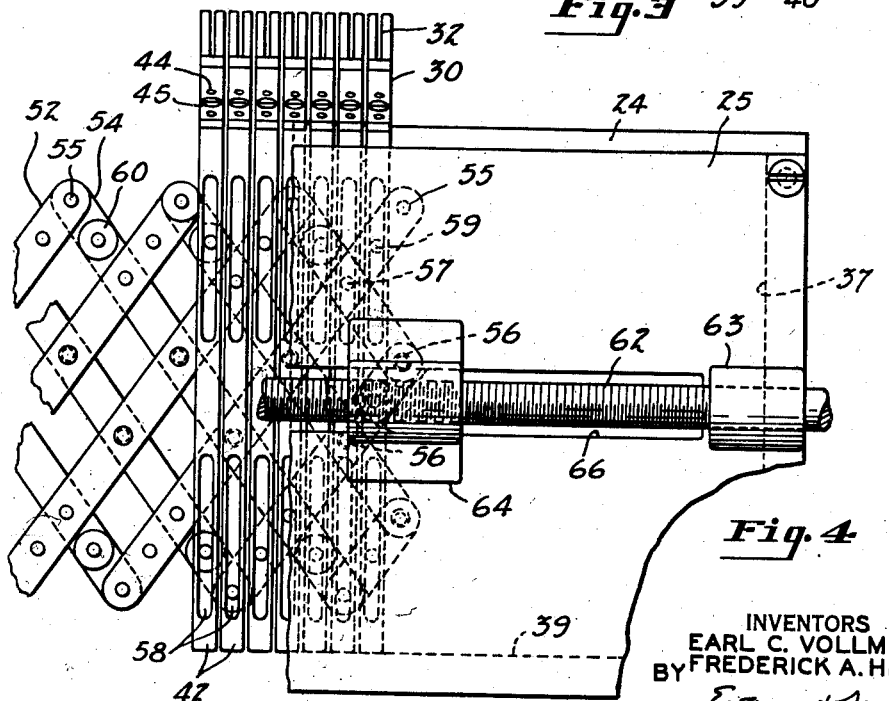
Fig. 4 is a view similar to Fig. 3, showing the lazy tongs and the guides in contracted position.

On rotation of the shaft 62 in one direction, the blocks 64 are forced together, guided by the support member 25, to thereby contract the lazy tongs and reduce the spacing between the guide elements 42, this contracted position of the parts being shown in Fig. 4. Rotation of the shaft 62 in the reverse direction separates the blocks 64 to expand the lazy tongs and increase the spacing between the guide elements 42, as shown in Fig. 3, while maintaining their parallel relation with one another.

The shafts 62 for the upper and lower blade spacers C and D, respectively, are provided at one end with beveled gears 70 which mesh with beveled gears 71 on a shaft 72 extending between the upper and lower blade spacers and mounted in journals 73. One of the rods 62 extends beyond the side frame 23 and has a crank 74 secured thereon, so that the rods for both of the spacing devices may be simultaneously rotated from the outside of the machine by the operator through the interconnecting gears 70 and 71 and the shaft 72. Thus the lazy tongs for the upper and lower blade spacers C and D, respectively, may be simultaneously actuated to maintain the corresponding blade guides 42 in substantially the same relative parallel position with respect to one another.

An arm 76 is attached to one of the blocks 64 of the upper blade spacer C and extends toward the center of the machine in parallel relation to the rod 62. This arm is guided by a bracket 77 secured to the support member 25 and at its end carries a pointer 78 which is movable over a scale 79 attached to the support member 25. Suitable indicia are provided on the scale 79 to indicate the various spacings between the blade guiding slots 32 of the fingers 30 and 31.

As the blocks 64 are moved toward or away from one another, the arm 76 carries the pointer 78 over the scale 79, which indicates to the operator, by visual observation, the spacing of the cutter bands 1.

The present invention thus provides a blade spacer in which the individual guide elements thereof are carried by support members independently of the mechanism for varying the spacing between the guide elements. Thus, a more rigid and sturdy construction is obtained, which resists lateral and other deflection, so that the guiding of the cutter bands is effected with increased accuracy. Furthermore, the wear on the parts is minimized, so that the device has a longer life, and the internal friction in the mechanism is reduced, so that it may be operated with greater ease.

In the movement of the blade guiding fingers 30 and 31 toward or away from one another during adjustment of the machine to vary the thickness of slices produced, the spacing device of the present invention will accurately proportion movements of the fingers while operating to decrease or increase the distance between the blades. Furthermore, the increments of movement with respect to the centerline of the slicing machine frame are equal for both ends of the device so that the end cutter bands are at all times equally spaced from the path of the articles through the machine. Accordingly, when the spacing devices are actuated to vary the thickness of the slices produced, it is unnecessary to reset the guides (not shown) employed to engage the ends of the articles advancing over the conveyor B to the slicing mechanism. Hence, the device of the present invention retains the bands as a group centered between the side frames of the machine regardless of their spacing.

The principles of the present invention may be utilized in numerous constructions, changes being made in the particular details shown and described as desired, it being understood that various modifications and alterations are contemplated and that the embodiment shown is given for purposes of explanation and illustration.

What we claim is:

1. A spacer comprising a multiplicity of guide elements disposed in side by side relation, means for supporting and guiding the elements, aligned apertures through the elements, a lazy tongs extending through said apertures, elongated slots in the guide elements, pins connected to the lazy tongs and extending into said slots, and means for actuating the lazy tongs.

2. A spacer comprising support members, a multiplicity of guide elements disposed between the members and having sliding engagement therewith, a lazy tongs disposed between said members, connections between the guide elements and lazy tongs, a block having sliding engagement with one of the support members to be guided thereby, a connection between said block and the lazy tongs, and a rotatable rod having threaded engagement with the block and disposed in parallel relation to the direction of longitudinal expansion and contraction of the lazy tongs, whereby rotation of the rod moves the block longitudinally thereof to expand and contract the tongs.

3. A spacer comprising a support member, a multiplicity of guide elements carried by said member, aligned apertures through the elements, a lazy tongs extending through the aperture so that spaced portions of each of the guide elements are disposed on opposite sides of the tongs, connectors between the tongs and the elements, said connectors each having bearing contacts with the spaced portions of the elements on the opposite sides of the tongs, and means for actuating the lazy tongs.

4. A spacer comprising a support member, a multiplicity of guide elements carried by the member and having sliding engagement therewith, aligned apertures through the elements, a lazy tongs extending through the apertures, elongated slots in the guide elements, holes in the tongs, pins extending through the holes in the tongs and the slots in the guide elements and having their ends in bearing engagement with the support member to be restrained against endwise movement thereby, and means for actuating the tongs to vary the spacing between the guide elements.

5. In a slicing machine having a plurality of movable cutters mounted with their cutting edges disposed in approximately a common plane, a cutter spacer and article guide comprising a support member, a multiplicity of elongated guide members carried by the support in side by side relation, and disposed so that the direction of their elongation substantially parallels the cutter plane, each guide member having at one end thereof a laterally extending finger portion which engages one of the cutters to guide the same, said fingers each having an article guiding surface disposed at an oblique angle to the cutter plane, means for simultaneously moving all of the guides toward and away from one another along the support to vary the spacing between the cutters, and an apron secured to the support and disposed obliquely to the cutter plane, said apron having an article contacting surface extending as a continuation of the article guiding surface of the fingers, and substantially coplanar therewith, and the apron having an edge portion disposed over the fingers to engage the same and restrain endwise movement of the guide members.

6. A spacer comprising a pair of spaced supports disposed in confronting relation, a multiplicity of elongated guide members disposed in side by side relation between the supports, and arranged to be supported and guided thereby, a lazy tongs between the supports, connectors between the lazy tongs and each of the guide members, an elongated slot in one of the supports, a block in said slot and guided for longitudinal movement therein, said block having a portion disposed on one side of the slotted support within the space between the supports, and connected to the lazy tongs, and another portion on the other side of the slotted support, a rod having threaded connection with said last named portion of the block, and restrained against endwise movement, whereby rotation of the rod on one side of the slotted support moves the block, and thereby actuates the lazy tongs on the other side of the slotted support for expansion and contraction, to vary the spacing between the guide members.

7. A spacer comprising a boxlike structure of support members open along one side and having an elongated slot in another side adjacent one end thereof, a multiplicity of elongated guide members disposed in side by side relation within the structure, to be supported and guided thereby, finger portions on the guide members extending from said open side, a lazy tongs within the structure, connectors between the lazy tongs and each of the guide members, said guide members, lazy tongs and connectors being substantially enclosed by the boxlike structure, holding means extending through the elongated slot, and connected to the lazy tongs in the interior of the structure, and means on the outside of the structure for moving said holding means to actuate the lazy tongs and expand and contract the same, to thereby vary the spacing between the guide members.

8. A spacer comprising a boxlike structure of support members open along one side and having an elongated slot in another side adjacent one end thereof, a multiplicity of elongated guide members disposed in side by side relation within the structure, to be supported and guided thereby, finger portions on the guide members extending from said open side, a lazy tongs within the structure, connectors between the lazy tongs and each of the guide members, said guide members, lazy tongs and connectors being substantially enclosed by the boxlike structure, holding means extending through the elongated slot and connected to the lazy tongs in the interior of the structure, means on the outside of the structure for moving said holding means to actuate the lazy tongs and expand and contract the same, to thereby vary the spacing between the guide members, and a guide apron secured to said structure, and having an edge portion disposed over the finger portions of the guide members at the open side of the structure to restrain endwise movement of the guide members through said open side.

9. In a slicing machine having a plurality of movable cutters, means for guiding articles during slicing and for spacing and guiding the cutters in approximately parallel paths, which comprises support members on opposite sides of the path of articles to the cutters, a plurality of guide members carried by each support member, each guide member having a finger portion which embraces one of the cutters to guide the same, and each finger portion having a surface for contacting and guiding a bread loaf during the slicing of the same, the article guiding surfaces of the finger portions on one of the support members being disposed in approximately a common plane substantially parallel to the like plane of the article guiding surfaces on the finger portions of the guide members carried by the support member on the opposite side of the article path, means for simultaneously moving all of the guides toward and away from one another along the support to vary the spacing between the cutters, and spaced article guiding aprons secured to the support members in substantially parallel relation to one another on opposite sides of the article path, each of said aprons having an article contacting surface extending as a continuation of the article guiding surfaces of the finger portions on the same side of the article path, and substantially coplanar therewith, to provide an article guiding channel having approximately parallel sides which extends to and through the cutters for all variations of their spacing, and said aprons each having an edge portion disposed over the ends of the finger portions associated therewith to engage the same and restrain endwise movement of the guide members.

10. In a slicing machine having a plurality of movable cutters, a spacer and article guide comprising a support member, a multiplicity of guide members carried by the support and disposed in side by side relation, each guide member having a finger portion which embraces one of the cutters to guide the same, means for simultaneously moving all of the guides toward and away from one another along the support, to vary the spacing between the cutters, and an article guiding apron secured to the support and having an edge portion which overlies the finger portions, said finger portions having article guiding surfaces which are disposed substantially in the plane of the article engaging surface of the apron.

11. In a slicing machine having a plurality of thin cutters supported for movement in spaced, substantially parallel planes, a supporting member disposed across the cutters, a plurality of guide elements carried by the member in side by side relation and having parts for individually engaging the cutters to space and guide the latter, means for simultaneously moving all the elements toward and away from one another to vary the spacing between the cutters, said movement effecting a movement of one of the elements along the supporting member a greater distance than the corresponding movement of the guide elements with respect to one another and proportional thereto, a scale bearing indicia representing successive spacing increments of the cutters, said indicia being spaced from one another a distance equal to the movement of said one element along the supporting member for each movement of the cutters required to separate the latter one spacing increment, a pointer, and means connecting said one element to the pointer or scale to effect relative movement of the pointer over the scale proportional to and greater than the movement of the cutters relative to one another whereby relatively small movements of the cutters relative to one another are indicated by proportional and larger movements of the pointer over the scale.

12. In a slicing machine having a plurality of movable cutters, an adjustable mechanism for spacing and guiding the cutters comprising a multiplicity of elongated relatively thin guide elements disposed in side by side relation for individually engaging the cutters and having aligned apertures therethrough, an expandable and contractable lazy tongs extending through the apertures of all of the guide elements so that spaced portions of each element are disposed on opposite sides of the lazy tongs, connectors between the lazy tongs and the guide elements, each of said connectors having bearing contacts with the said spaced portions of the guide elements on the opposite sides of the lazy tongs, and means for actuating the lazy tongs.

13. In a slicing machine having a plurality of movable cutters, an adjustable mechanism for spacing and guiding the cutters comprising a multiplicity of elongated relatively thin guide elements disposed in side by side relation for individually engaging the cutters and having aligned apertures therethrough, an expandable and contractable lazy tongs extending through the apertures of all of the guide elements so that spaced portions of each element are disposed on opposite sides of the lazy tongs, connectors between the lazy tongs and the guide elements, each of said connectors having bearing contacts with the said spaced portions of the guide elements on the opposite sides of the lazy tongs, a rotatable rod disposed in parallel relation to the direction of expansion and contraction of the lazy tongs and having oppositely threaded ends, threaded blocks on said ends of the rod and having connection with opposite ends of the lazy tongs, and means for rotating the rod to move the blocks toward and away from one another and thereby contract and expand the lazy tongs to uniformly vary the spacing between the guide elements.

14. In a slicing machine having a plurality of movable cutters, an adjustable mechanism for spacing and guiding the cutters comprising a multiplicity of elongated relatively thin guide elements disposed in side by side relation for individually engaging the cutters and having aligned apertures therethrough, an expandable and contractable lazy tongs extending through the apertures of all of the guide elements so that spaced portions of each element are disposed on opposite sides of the lazy tongs, connectors between the lazy tongs and the guide elements, each of said connectors having bearing contacts with the said spaced portions of the guide elements on the opposite sides of the lazy tongs, a rotatable rod disposed in parallel relation to the direction of expansion and contraction of the lazy tongs and having oppositely threaded ends, a fixed member supported in stationary position between the guide elements and the rotatable rod, threaded blocks on said ends of the rod and having sliding engagement with said stationary member to be guided thereby, said blocks having connection with opposite ends of the lazy tongs, and means for rotating the rod to move the blocks toward and away from one another along the stationary member and thereby contract and expand the lazy tongs to uniformly vary the spacing between the guide elements.

15. In a slicing machine having a plurality of movable cutters, an adjustable mechanism for spacing and guiding the cutters comprising a multiplicity of elongated relatively thin guide elements disposed in side by side relation for individually engaging the cutters, an expandable and contractable lazy tongs extending across the guide elements, connecting means between the guide elements and the lazy tongs, each guide element having at least two spaced connections with the lazy tongs to retain the guide elements in parallelism, a rotatable rod having oppositely threaded ends disposed in parallel relation to the direction of expansion and contraction of the lazy tongs and being longer than the lazy tongs at maximum expansion, a fixed member supported in stationary position between the guide elements and the rotatable rod and being longer than the lazy tongs at maximum expansion, threaded blocks on said ends of the rod and having sliding engagement with said stationary member to be guided thereby, said blocks having connection with opposite ends of the lazy tongs, and means for rotating the rod to move the blocks toward and away from one another along the stationary member and thereby contract and expand the lazy tongs to uniformly vary the spacing between the guide elements.

16. In a slicing machine having a plurality of movable cutters, an adjustable mechanism for spacing and guiding the cutters comprising a multiplicity of elongated relatively thin guide elements disposed in side by side relation for individually engaging the cutters, an expandable and contractable lazy tongs extending across the guide elements, connecting means between the guide elements and the lazy tongs, each guide element having at least two spaced connections with the lazy tongs to retain the guide elements in parallelism, a rotatable rod having oppositely threaded ends disposed in parallel relation to the direction of expansion and contraction of the lazy tongs and being longer than the lazy tongs at maximum expansion, a fixed member supported in stationary position between the guide elements and the rotatable rod and being longer than the lazy tongs at maximum expansion, threaded blocks on said ends of the rod and having sliding engagement with said stationary member to be guided thereby, said blocks having connection with opposite ends of the lazy tongs, means for rotating the rod to move the blocks toward and away from one another along the stationary member and thereby contract and expand the lazy tongs to uniformly vary the spacing between the guide elements, said stationary member including means having individual sliding engagement with the guide elements as the latter are moved toward and away from one another to resist endwise shifting of the guide elements under frictional thrusts of the cutters.

17. In a slicing machine having a plurality of movable cutters, an adjustable mechanism for spacing and guiding the cutters comprising an expandable and contractable lazy tongs that includes a first group of elongated elements disposed in parallel side by side relation, a second group of elongated elements disposed in parallel side by side relation, the elements of the first group each being at an angle to the elements of the second group, and pivotal connections between the elements of the two groups at their intersections, the elements each being individually connected to at least four elements of the other group, a plurality of spaced pins connected to each element of one group and disposed between the center and one end of each such element, a multiplicity of elongated relatively thin guides disposed in side by side relation for individually engaging the cutters, each guide having connection with one of said pins to be actuated thereby for lateral movement, other pins connected to the lazy tongs elements and having connection with the guides, said other pins each being paired with one of the first mentioned pins and spaced therefrom so that the pins of each pair are connected to spaced parts of a single guide to maintain the guides in parallelism, and means for expanding and contracting the lazy tongs.

EARL C. VOLLMER.
FREDERICK A. HERWEHE.